Aug. 19, 1958     J. R. HAYES     2,848,192
MULTI-PIECE HOLLOW TURBINE BUCKET
Filed March 12, 1953     3 Sheets-Sheet 1
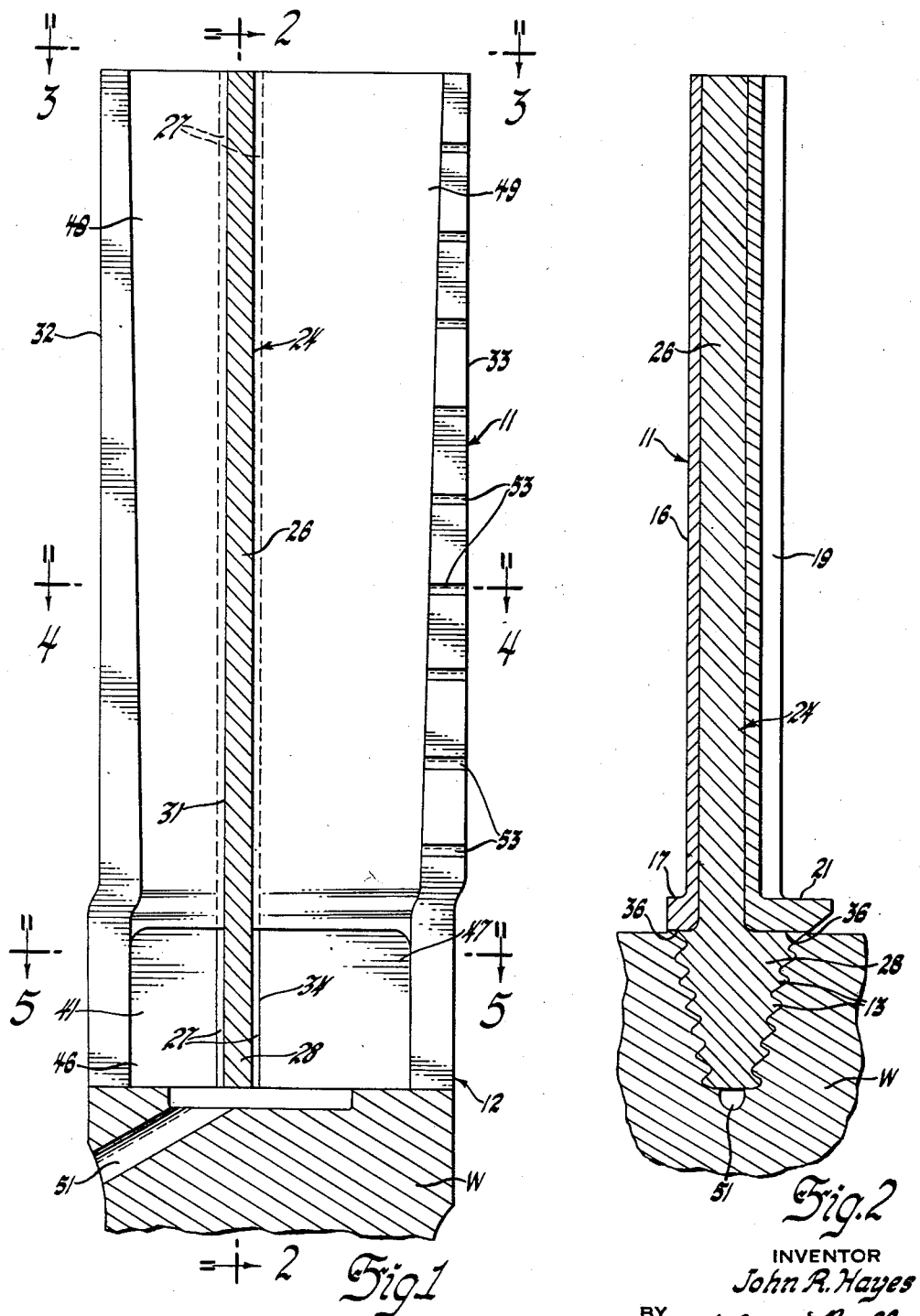
INVENTOR
John R. Hayes
BY
Willits Helmig & Baillio
ATTORNEYS Aug. 19, 1958 J. R. HAYES 2,848,192
MULTI-PIECE HOLLOW TURBINE BUCKET
Filed March 12, 1953 3 Sheets-Sheet 2

INVENTOR
John R. Hayes
BY
Willits, Helwig & Baillio
ATTORNEYS

Aug. 19, 1958   J. R. HAYES   2,848,192
MULTI-PIECE HOLLOW TURBINE BUCKET
Filed March 12, 1953   3 Sheets-Sheet 3

INVENTOR
John R. Hayes
BY
Willits, Helwig & Baillie
ATTORNEYS form of the blade and that the form of the root or mounting of the blade may follow various known practices. In other words, a turbine bucket according to the invention may be applied in place of previously known solid or hollow turbine buckets to conventional turbine wheels.

United States Patent Office 2,848,192
Patented Aug. 19, 1958

2,848,192
MULTI-PIECE HOLLOW TURBINE BUCKET

John R. Hayes, Indianapolis, Ind., assignor to General Motors Corporation, Detroit, Mich., a corporation of Delaware Application March 12, 1953, Serial No. 341,907

12 Claims. (Cl. 253—39.15)

My invention relates to turbine buckets and other similar elements and is particularly directed to a turbine bucket construction which is adapted to resist the high temperatures and stresses existing in gas turbines. To this end, a turbine bucket according to the invention has a configuration which may readily be forged, which is of high structural strength, and which provides for circulation of cooling air or other fluid (which will be referred to as air for conciseness) through the bucket. The bucket also has advantages in resistance to destructive vibration because of its multipiece construction giving rise to internal friction which will effectively damp vibration of the bucket.

In its preferred embodiment, the invention may be briefly described as comprising a turbine bucket or other similar machine element having a blade portion and a base portion, one lateral face of the blade portion and of the base or root portion being constituted by one part and the other lateral face of these portions being defined by a second part, these parts being mounted in abutting relation so that they define the outer surface of the blade and most of that of the root; together with a key which is in dovetail engagement with the other two parts to hold them assembled. Preferably, the base of the bucket is of the conventional fir tree configuration or the equivalent and the key includes a head which extends through slots in the base portions of the other two parts and is dovetailed in the same manner as the rest of the base, so that the key itself is directly mounted in the turbine wheel or the like. The two parts described are spaced from each other internally to define a cooling air chamber or passage which may or may not be open at the outer end of the bucket and which may discharge through openings in the wall of the blade portion. The nature of the invention and the advantages thereof will be more clearly understood by reference to the appended specification and to the accompanying drawings illustrating preferred embodiments of the invention, in which:

Fig. 1 is a longitudinal sectional view of a turbine bucket according to the first form of the invention illustrating a mounting in a conventional turbine wheel;

Fig. 2 is a longitudinal sectional view of the same taken on the plane indicated by the line 2—2 in Fig. 1;

Figure 3:
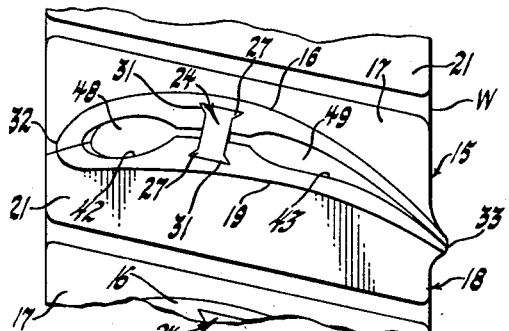
Fig. 3 is an end view of the same viewed from the tip of the blade as indicated by the line 3—3 in Fig. 1.
Figure 4:
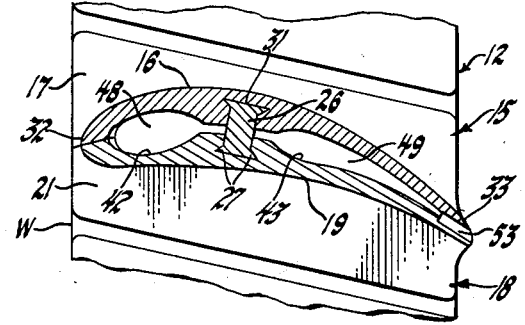
Fig. 4 is a transverse sectional view of the same taken on the plane indicated by the line 4—4 in Fig. 1.
Figure 5:
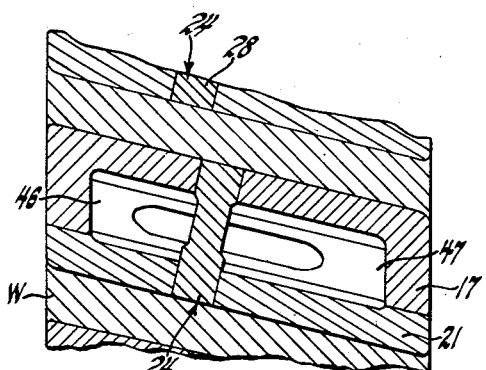
Fig. 5 is a transverse sectional view of the same taken on the plane indicated by the line 5—5 in Fig. 1.

Referring first to Figs. 1 to 5 and 8 to 10, inclusive, there is shown therein a turbine bucket of conventional external configuration; that is, having the external contours of the blade and of the base or root of a typical form adapted to a gas turbine. It will be understood that the invention does not concern itself with the aerodynamic form of the blade and that the form of the root or mounting of the blade may follow various known practices. In other words, a turbine bucket according to the invention may be applied in place of previously known solid or hollow turbine buckets to conventional turbine wheels.

The bucket comprises a blade portion 11 and a base or root portion 12, the latter being mounted in conventional manner in a turbine wheel W. As will be most clearly apparent from Figs. 2 and 10, the mounting illustrated herein is of the conventional multiple dovetail or fir tree type in which the base of the bucket is formed with a number of parallel serrations or ribs 13. The bucket is comprised principally of two parts which abut substantially along a central plane of the blade and root, each part defining one face of the blade and one face of the root. Thus we have a part indicated generally in Fig. 3 as 15 (see also Fig. 8), defining the convex side 16 of the blade, and one part 17 of the root, and a part 18 defining the concave side 19 of the blade and the part 21 of the root.

The sectional view of Fig. 1 is taken along the split plane between the parts 15 and 18. These two parts are held assembled in abutting relation by a key 24 (see particularly Fig. 9), comprising a body 26 with dovetail flanges 27 and a head 28 which forms a part of the base of the bucket. The flanges 27 of the key 24 slide into mating dovetail grooves 31 machined in the blade parts 16 and 19 and, thus, hold these parts assembled in abutting relation, meeting at the leading edge 32 and at the trailing edge 33. The head 28 of the key extends through an opening defined by slots 34 in the base portions 17 and 21 and may abut shoulders 36 (Figs. 2 and 10) on these parts. The key 24 is inserted from the base end of the bucket and, after the assembly is completed, the grooves or serrations 13 are finished on the three parts 15, 18, and 24 so that the dovetail surface of the base is continuous, as will be apparent from Fig. 10.

Thus, when the bucket is mounted in the turbine rotor or the like, the key is attached thereto by its own head which serves as a base or root for the key and each of the parts 15 and 18 is attached by its own part of the dovetail serrations. Thus each part is self-supporting and is adequately retained without any question of affixation to other parts.

The confronting faces of the two parts 15 and 18 are concave so as to provide a cavity 41 (Fig. 8) in the base portion of each part and two passages 42 and 43 extending longitudinally of the blade portion, one on each side of the slot 31. As will be apparent, with the key in place, the blade defines two chambers or cavities 46 and 47 in the base and air passages 48 and 49 extending through the blade on each side of the key 24. Air or other coolant may be supplied to the bucket in any suitable manner, as, for example, through a passage 51 in the wheel which communicates with the chambers 46 and 47 in the base. The free end of the blade may be open as illustrated or may be partially closed by suitably forming the free end of the blade. Air may be withdrawn from the blade as seems most desirable. Particularly, to improve the circulation of air, the abutting edges of the parts may be grooved as indicated at 53 in Figs. 1 and 4 to provide openings for discharge of cooling air.

Figure 6:
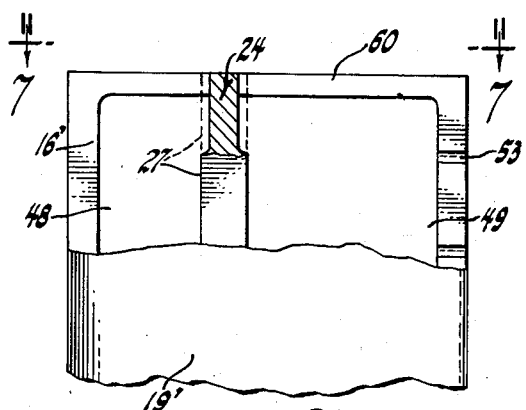
Fig. 6 is a fragmentary view of the outer end of a second form of bucket in which the outer end of the blade is closed, the view being partly in section.
Figure 7:
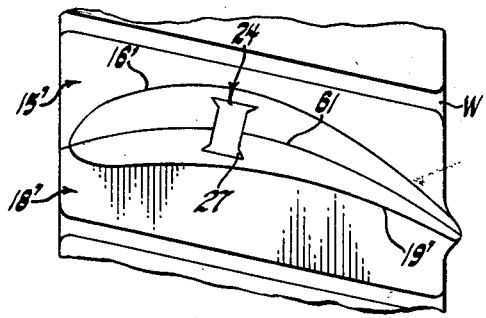
Fig. 7 is a view of the outer end of the bucket of Fig. 6 as indicated by the line 7—7 in Figure 6.
Figure 8:
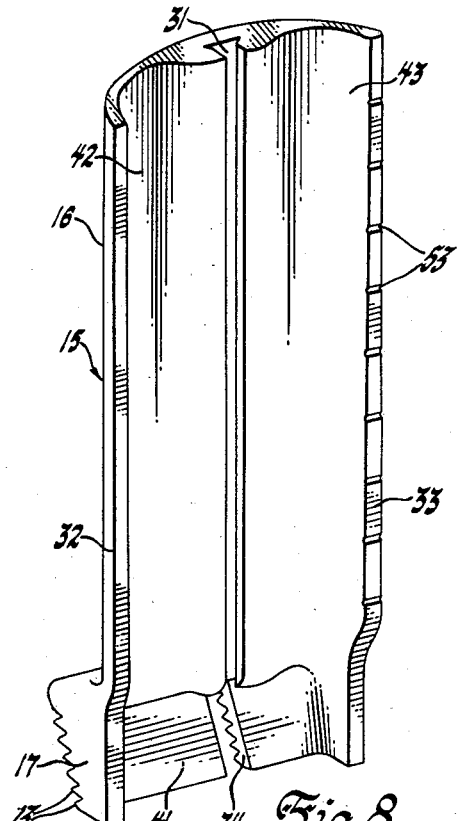
Figure 8 is an axonometric view of one of the parts of the bucket of Fig. 1.
Figure 9:
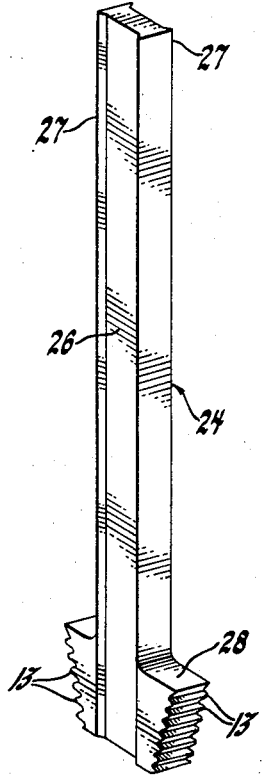
Fig. 9 is an axonometric view of a key which may be applied to either species of the invention; and, Fig. 10 is an axonometric view of the base end of the bucket of either form of the invention.
Figure 10:
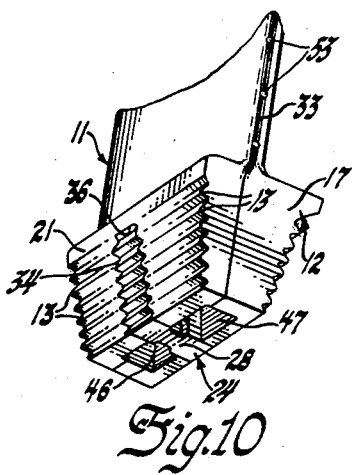

If it is desired to discharge substantially all of the air through the side or edge of the bucket the outer end of the passages 48 and 49 may be closed as illustrated in Fig. 6, which illustrates a modified form of the invention, in which modified parts are indicated by primed referenced characters. This form differs from the form previously described in that the two parts 16' and 19' are each provided with a flange or rib 60 at the outer end, these flanges meeting along the line 61 so that the outer end of the blade is closed except for incidental leakage. As will be apparent, the form of the bucket of Figs. 6 and 7 may be the same as that of the other figures except for this change.

It will also be apparent to those skilled in the art that the structure of the invention is particularly adapted to damp out vibration which is a prevalent problem in turbine buckets leading to failures, since any flexure of the blade portion would be accompanied by rubbing between the parts both along the dovetail slots and at the mating edges of the parts, so that a high degree of damping would be provided. It may also be noted that the key 26 functions as a spar or stiffening member for the blade in addition to locking the parts together.

The invention is applicable to blades having various forms of blade roots; and to elements such as turbine nozzle vanes and the like, but is considered to have its greatest field of usefulness in application to turbine rotors.

The detailed description herein of the preferred form of the invention for the purpose of explaining the principles and advantages thereof is not to be regarded as limiting or restricting the scope of the invention, since many modifications thereof may be made by the exercise of skill in the art.

Reference is made to my copending application Serial No. 341,908, filed March 12, 1953, for "Two-Piece Turbine Bucket," which is directed to subject matter related to that of this application.

I claim:

1. A turbine bucket or the like comprising, in combination, two parts defining the respective faces of the blade portion of the bucket and a key in dovetail engagement with the two said parts and holding them in opposed abutting relation, each of the parts and the key being provided with a base portion adapted for mounting in, and retention against movement longitudinally of the blade by, a turbine rotor or the like.

2. A hollow turbine bucket or the like comprising, in combination, two parts defining the respective faces of the blade portion of the bucket and a key in dovetail engagement with the two said parts and holding them in opposed abutting relation, each of the parts and the key being provided with a base portion adapted for mounting in, and retention against movement longitudinally of the blade by, a turbine rotor or the like, and the parts being spaced internally of the bucket to define a cavity within the bucket.

3. A bucket or the like as defined in claim 2 in which the outer end of the blade portion is open.

4. A bucket or the like as defined in claim 2 in which the outer end of the blade portion is closed.

5. A bucket or the like as defined in claim 2 in which an edge of one of the parts abutting the other part is notched to provide outlets from the cavity.

6. A turbine comprising, in combination, a rotor having a blade mounting slot therein and a hollow turbine bucket mounted in the slot, the bucket comprising two parts defining the respective faces of the blade portion of the bucket and a key in dovetail engagement with the two said parts and holding them in opposed abutting relation, each of the parts and the key being provided with a base portion adapted for mounting in the slot and retention against movement longitudinally of the blade by the rotor.

7. A turbine as recited in claim 6 in which the parts of the blade define between them a coolant passage and the rotor defines a passage for supply of coolant thereto.

8. A turbine bucket or the like comprising, in combination, two parts defining the respective faces of the blade portion of the bucket and a key extending longitudinally of the blade portion in dovetail engagement with the two said parts and holding them in opposed abutting relation, each of the parts being provided with a base portion, the two base portions constituting a base for the bucket adapted for mounting and retention against movement longitudinally of the blade in a turbine rotor or the like, and the key also including a base portion extending to the exterior of the said base and conforming thereto in contour.

9. A turbine bucket or the like comprising, in combination, two parts defining sections of the blade portion of the bucket and a key in dovetail engagement with the two said parts and holding them in opposed abutting relation, each of the parts and the key being provided with a base portion adapted for mounting and retention against movement longitudinally of the blade in a turbine rotor or the like.

10. A turbine bucket or the like comprising a blade portion and a base portion, these portions being defined by two parts mounted in opposed abutting relation, each part defining one section of the blade portion and one section of the base portion, and means for maintaining the two parts in assembled opposed relation comprising a key extending longitudinally of the bucket, the key and the two said parts being formed with interengaging dovetails, the key including a head and the base portions of the parts defining an opening through which the head extends so that the head of the key may be engaged by the mounting means for the base of the blade.

11. A turbine bucket or the like comprising a blade portion and a base portion, these portions being defined by two parts mounted in opposed abutting relation, each part defining one section of the blade portion and one section of the base portion, the opposed parts being so formed that their inner faces define between them a cavity in the base portion and the blade portion, and means for maintaining the two parts in assembled opposed relation comprising a key extending longitudinally of the blade portion, the key and the two said parts being formed with interengaging dovetails, the key including a head and the base portions of the parts defining an opening through which the head extends so that the head of the key may be engaged by the mounting means for the base of the blade.

12. A turbine bucket or the like comprising a blade portion and a base portion, these portions being defined by two parts mounted in opposed abutting relation, each part defining one face of the blade portion and one side of the base portion, the opposed parts being so formed that their inner faces define between them a cavity in the base portion and a cavity in the blade portion communicating therewith, and means for maintaining the two parts in assembled opposed relation comprising a key extending longitudinally of the bucket, the key and the two said parts being formed with interengaging dovetails, the key including a head and the base portions of the parts being provided with slots through which the head extends so that the head of the key may be engaged by the mounting means for the base of the blade.

References Cited in the file of this patent

UNITED STATES PATENTS

| | | |
|---|---|---|
| 665,600 | Geisenhoner | Jan. 8, 1901 |
| 1,255,650 | Samuelson | Feb. 5, 1918 |
| 1,530,249 | Eveleth | Mar. 17, 1925 |
| 2,183,158 | Bennett | Dec. 12, 1939 |
| 2,231,772 | Nelson | Feb. 11, 1941 |
| 2,644,665 | Cangemi | July 7, 1953 |

FOREIGN PATENTS

| | | |
|---|---|---|
| 133,353 | Australia | July 14, 1949 |